US007061867B2

United States Patent
Huang et al.

(10) Patent No.: US 7,061,867 B2
(45) Date of Patent: Jun. 13, 2006

(54) RATE-BASED SCHEDULING FOR PACKET APPLICATIONS

(75) Inventors: Anguo T. Huang, Mountain View, CA (US); Jing Ling, Fremont, CA (US); Jean-Michel Caia, San Fransico, CA (US); Juan-Carlos Calderon, Fremont, CA (US); Vivek Joshi, Sunnyvale, CA (US)

(73) Assignee: Intel Corporation, Santa Clara, CA (US)

(*) Notice: Subject to any disclaimer, the term of this patent is extended or adjusted under 35 U.S.C. 154(b) by 629 days.

(21) Appl. No.: 10/115,229

(22) Filed: Apr. 2, 2002

(65) Prior Publication Data

US 2003/0185155 A1 Oct. 2, 2003

(51) Int. Cl.
*H04J 1/16* (2006.01)
*H04L 1/00* (2006.01)
*H04L 12/26* (2006.01)
*G01R 31/08* (2006.01)

(52) U.S. Cl. .................. 370/235; 370/230; 370/231; 370/412; 370/395.1

(58) Field of Classification Search ............ 370/229, 370/230, 231, 412, 414, 416, 418, 464, 468, 370/235, 351–356, 395.1, 400, 401
See application file for complete search history.

(56) References Cited

U.S. PATENT DOCUMENTS

| 6,047,000 | A | * | 4/2000 | Tsang et al. ............... 370/412 |
| 6,052,375 | A | * | 4/2000 | Bass et al. ................. 370/412 |
| 6,754,206 | B1 | * | 6/2004 | Nattkemper et al. ........ 370/369 |
| 2002/0136230 | A1 | * | 9/2002 | Dell et al. .................. 370/416 |

FOREIGN PATENT DOCUMENTS

EP    0 700 186    3/1996

OTHER PUBLICATIONS

Tannenbaum, A., "The Network Layer", *Computer Networks*, pp. 380–384, 1996 (XP002245023).
Nathalie Giroux Sudhakar Ganti,"Queuing and Scheduling", *Quality of Service in ATM Networks: State–of–the–Art Traffic Management*, pp. 96–109, 1999 (XP002245024).

* cited by examiner

Primary Examiner—Wellington Chin
Assistant Examiner—Raj Jain
(74) Attorney, Agent, or Firm—Fish & Richardson P.C.

(57) ABSTRACT

The rate-based scheduling for a network application is used to control the bandwidth available to a flow while scheduling the transmission of the flow. The rate-based scheduling uses rate credits to represent the amount of data a flow is permitted to transmit and only permits a flow to transmit if the flow has rate credit available. A flow is permitted to transmit only if the peak packet rate for the scheduler has not been exceeded.

40 Claims, 7 Drawing Sheets

Scheduled transmission time:

FIG. 6B

Actual transmission time (assuming Scheduler B has higher priority):

FIG. 7

RATE-BASED SCHEDULING FOR PACKET APPLICATIONS

TECHNICAL FIELD

This description relates to a digital communication system, and more particularly to a system that includes a high speed packet-switching network that transports variable-size packets.

BACKGROUND

High speed packet-switching networks, such as Asynchronous Transfer Mode (ATM), Internet Protocol (IP), and Gigabit Ethernet, support a multitude of connections to different sessions. It is advantageous for high speed packet-switching networks to be able to provide guaranteed bandwidth to networking applications.

DESCRIPTION OF DRAWINGS

Like reference symbols in the various drawings indicate like elements.

DETAILED DESCRIPTION

Digital communication systems typically employ packet-switching systems that transmit blocks of data called packets. Typically, the data to be sent are longer than the size of a packet, and must be broken into a series of packets. Each packet consists of a portion of the data being transmitted and control information in a header used to route the packet through the network to its destination.

Figure 1:
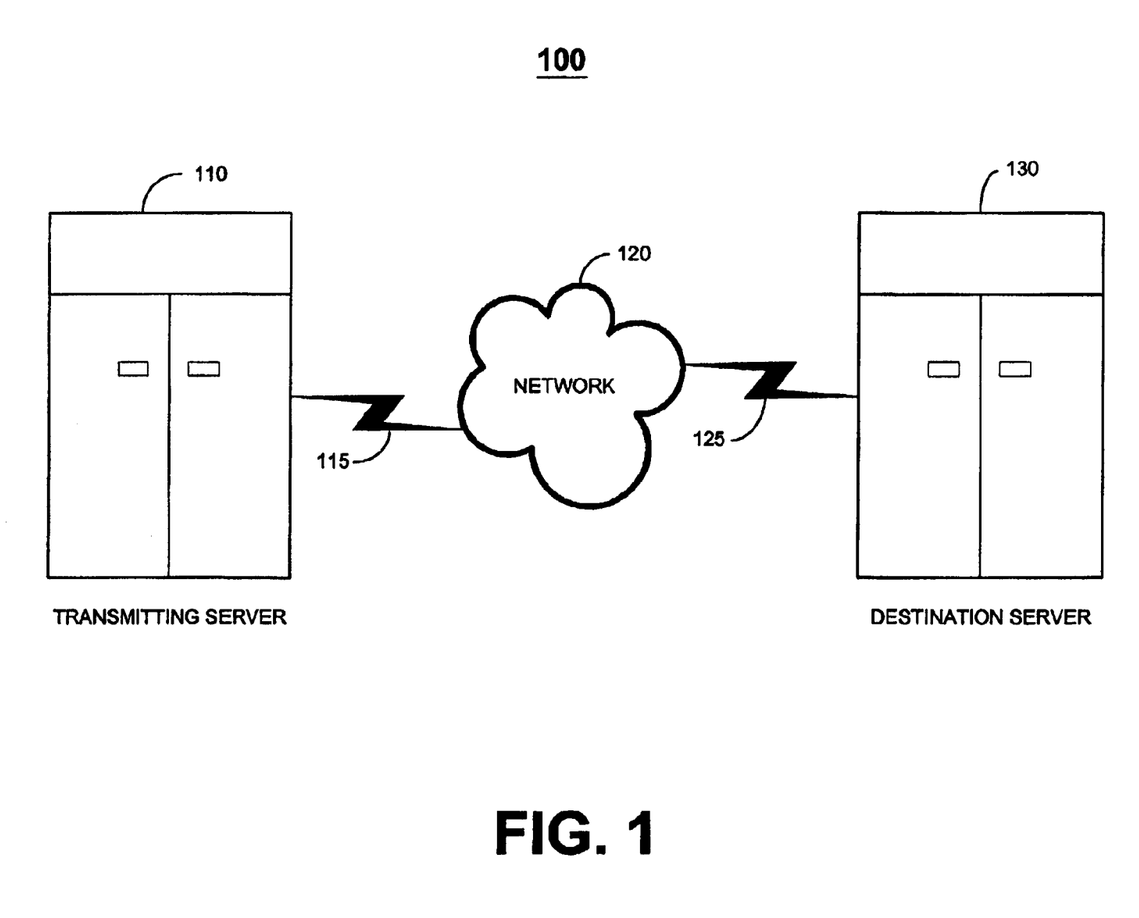
FIG. 1 is a diagram of a packet-switching network.

A typical packet-switching system 100 is shown in FIG. 1. In the system 100, a transmitting server 110 is connected through a communication pathway 115 to a packet-switching network 120 that is connected through a communication pathway 125 to a destination server 130. The transmitting server 110 sends a message as a series of packets to the destination server 130 through the packet-switching network 120. In the packet-switching network 120, the packets typically pass through a series of servers. As each packet arrives at a server, the server stores the packet briefly before transmitting the packet to the next server. The packets proceed through the network until they arrive at the destination server 130.

High-speed packet-switching networks are capable of supporting a vast number of connections (also called flows). Some broadband networks, for example, may support 256,000 connections through 64 logical ports. Each flow is scheduled for transmission through a port assigned to the flow.

Figure 2:
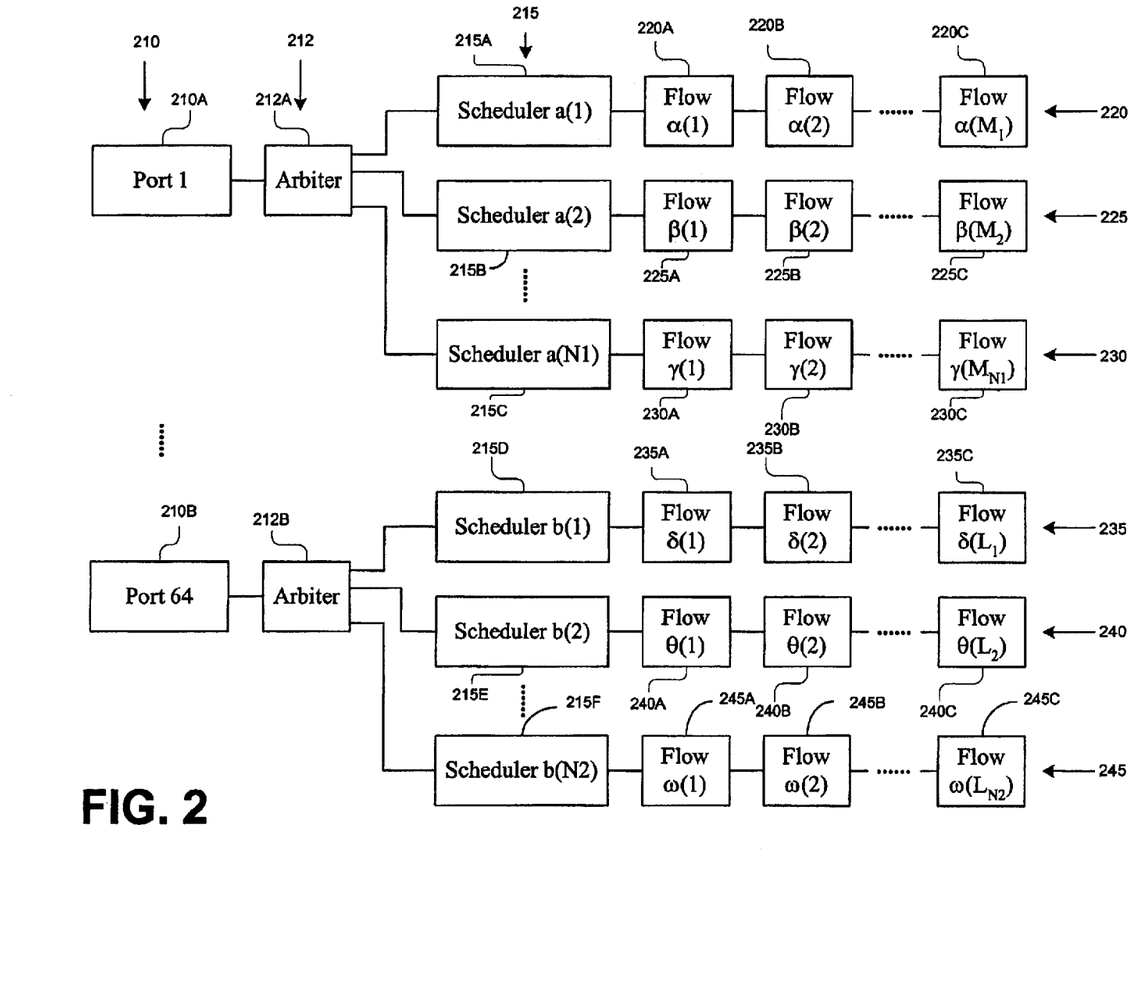
FIG. 2 is a diagram of multi-port interface in a packet-switching network.

As illustrated in FIG. 2, a typical multi-port interface 200 includes ports 210, each of which is linked through an arbiter 212 to schedulers 215 (also called shapers in ATM networks) that determine the transmission order of all of the flows 220 that are linked to the schedulers. For example, as shown in FIG. 2, a first port 210A is linked through an arbiter 212A to the schedulers 215, each of which is linked to a set of flows.

For brevity, FIG. 2 illustrates only a small number of the elements of the interface 200. As illustrated in FIG. 2, a scheduler 215A determines the transmission order of flows 220A, 220B, and 220C that are linked to the scheduler. Only three flows are illustrated for each scheduler 215.

If a conflict arises between schedulers 215 that are ready to transmit packets, arbiter 212 may be used to determine the priority of each scheduler 215 linked to a port 210. For example, as illustrated in FIG. 2, arbiter 212A may determine the priority of schedulers 215A, 215B and 215C to port 210A.

Network applications may require guaranteed bandwidth that is provided but not exceeded. This is straightforward in ATM networks where all the cells are of a fixed length. In variable-length packet-switching networks, however, providing a certain transmission rate is difficult because of the variations in packet size. Often, variable-length packet-switching networks use the number of packets sent as a measure of the network capacity provided. This is a poor measure of the transmission capacity used because large variable-length packets will transmit more data, and often, significantly more data, than the same number of small variable-length packets.

The transmission capacity used may be more accurately measured by controlling the bandwidth available to a flow and using the bandwidth available as a surrogate measure for the transmission capacity used. Controlling the bandwidth available to a flow also allows transmission rate guarantees to be met without exceeding such guarantees.

Bandwidth control may be accomplished by using rate-based scheduling to control the bandwidth available to a flow while scheduling the transmission of the flow. The rate-based scheduling uses rate credits to represent the amount of data a flow is permitted to transmit and only permits a flow to transmit if the flow has rate credit available. A flow may be permitted to transmit only if the peak packet rate for the scheduler has not been exceeded. Once a scheduler starts transmitting data from its flows, the scheduler sequentially checks each flow to which the transmitting scheduler is linked (often referred to as polling) and transmits a complete packet from every flow that has sufficient rate credit.

Figure 3:
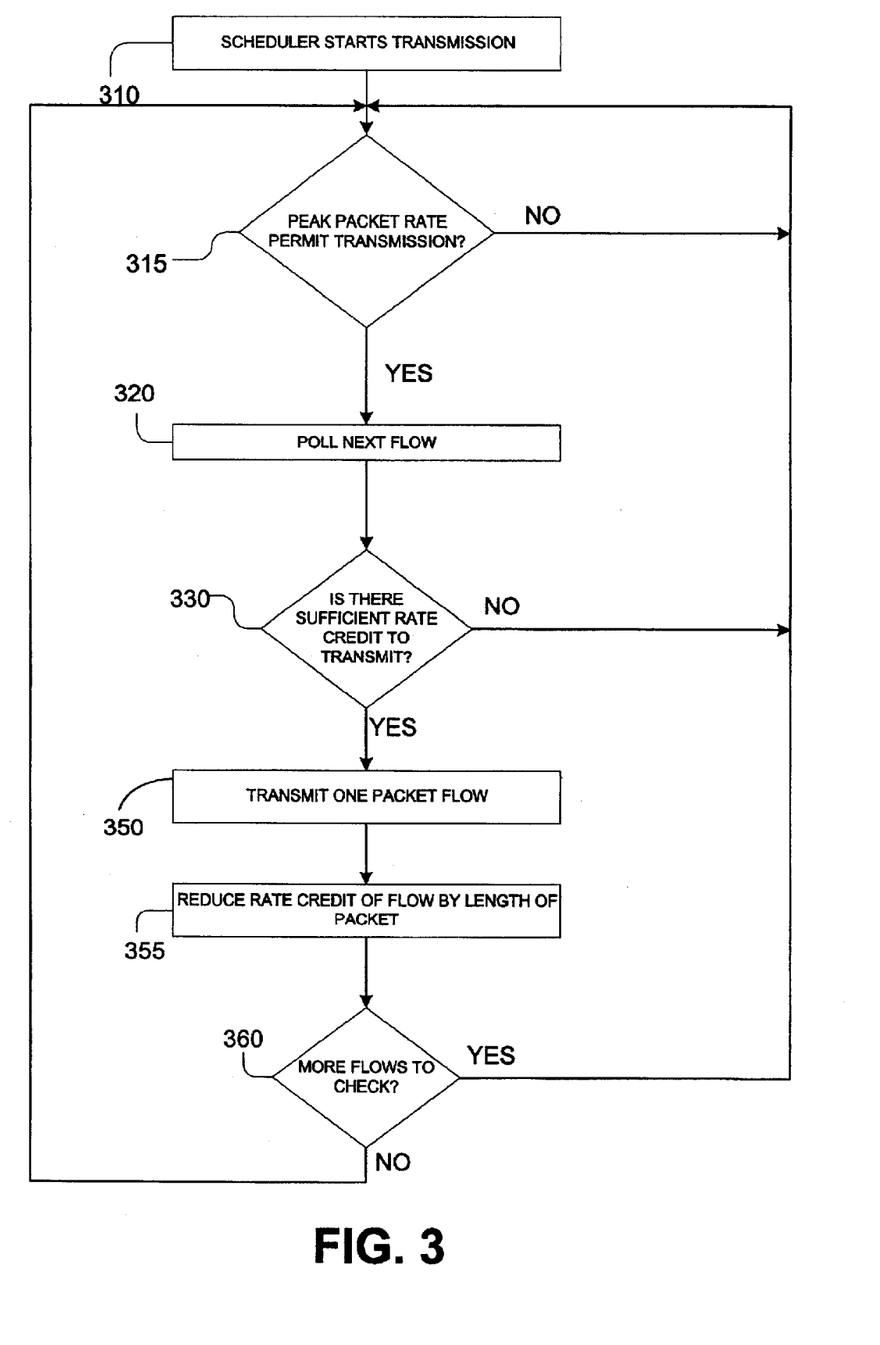
FIG. 3 is a flow chart illustrating a process for scheduling the transmission of flows through a scheduler.

As shown in FIG. 3, a rate-based scheduling procedure begins when a scheduler starts transmitting (310), at which point the scheduler checks if the peak packet rate has been exceeded (315), and, if so, the scheduler waits to poll the next flows until the peak packet rate is not exceeded. Then the scheduler polls the next flow that is linked to the scheduler (320). The scheduler then determines whether the flow has sufficient rate credit to transmit (330), and if not, the scheduler polls the next flow (320). If the flow does have sufficient rate credit to transmit, the scheduler transmits one complete packet from the flow (350), reduces the rate credit of the flow by the length of the packet (355), and determines whether there are additional flows to check (360). If so, the polling continues (320). Otherwise, the scheduler checks if the peak packet rate has been exceeded (315) and continues as described above.

Figure 4:
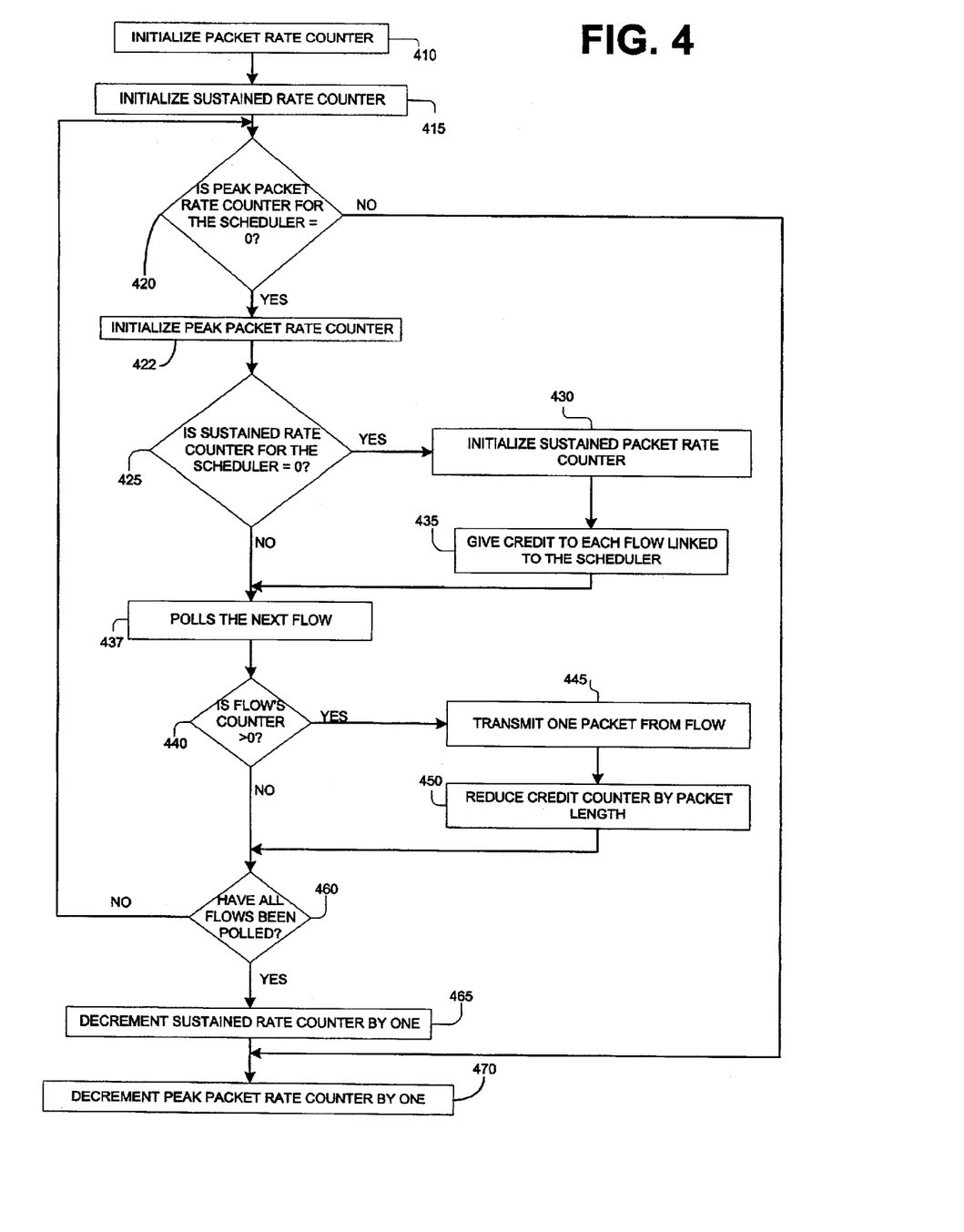
FIG. 4 is a flow chart of a process for using a rate-credit method to determine whether a flow can transmit a packet.

One implementation of rate-based scheduling controls the bandwidth available to a flow by using three variables or counters—a peak packet rate counter, a sustained rate counter, and a credit counter—as illustrated by FIG. 4.

A peak packet rate counter monitors the peak packet rate for the scheduler during the transmission. The peak packet rate represents the maximum number of packets that can be sent during a period and is measured by, for example, packets per second. All the flows linked to a particular scheduler have the same peak packet rate as the scheduler. The peak packet rate counter is initialized to the maximum peak packet rate for a scheduler, which may be characterized for scheduler(i) as:

1/[(peak packet rate for scheduler(i))*system clock period].

A sustained rate counter monitors the number of times that a scheduler has been active. The sustained rate counter is initialized to a value set for each scheduler. Rate credit is given to each flow linked to a scheduler periodically, based on the number of times a scheduler has been active. For instance, rate credit may be given to each flow linked to a scheduler once the scheduler has been active 100 times.

A credit counter reflects the rate credit of a flow. Each flow is given an initial amount of rate credit (which may be represented as a variable CREDIT), which may be different for each flow. A credit counter for each flow is decremented by the packet length of the transmitted packet whenever a flow transmits a packet. A credit counter may have a negative value after a flow transmits a packet that is longer than the value of the flow's credit counter. A credit counter for any flow may range from the negative of the maximum packet length plus one to the initial value of credit provided to the flow.

The credit counters for each flow linked to a scheduler are given additional credit whenever the scheduler has been active the number of times required by the sustained rate counter. When rate credit is given to a flow having a credit counter that is zero or positive, the credit counter for the flow is set equal to the initial amount of credit provided to the flow. This ensures that a flow does not accumulate rate credits during one or more periods in which the flow does not have data to transmit. If the credit counter for a flow is negative when credit is given to the flow, then the flow receives rate credit equal to the difference of the initial value of rate credit provided to the flow and the magnitude of the credit counter's negative value. This ensures that the flow cannot transmit more data over time than its assigned bandwidth. While the flow may temporarily exceed its bandwidth limitations by transmitting a packet larger than its allowed rate (and receive a negative value in the flow's credit counter), the flow loses an equal amount of bandwidth during the next sustained rate cycle.

By setting the initial values of these three variables (the peak packet rate counter, the sustained rate counter and the credit counter), the amount of bandwidth available to each flow may be controlled without exceeding a guaranteed bandwidth for a flow. The sustained rate for a flow may be represented as:

CREDIT/[(peak packet rate for the flow's scheduler)*(initial value of the sustained rate counter for the flow's scheduler)*(system clock period)]

As shown in FIG. 4, a rate-based scheduling procedure for determining the order of packet transmission from various flows linked to a scheduler begins when the scheduler initializes the packet rate counter (410), initializes the sustained rate counter (415), and determines whether the peak packet rate counter for the scheduler is zero (420). If the peak packet rate counter is equal to zero, the scheduler initializes the peak packet rate counter (422) and determines whether the sustained rate counter for the scheduler is zero (425). If so, the scheduler initializes the sustained rate counter (430) and gives credit to each flow linked to the scheduler (435). The scheduler polls the first flow (437) and checks whether the credit counter for the flow is greater than zero (440). If so, the scheduler transmits one complete packet from the flow (445) and reduces the credit counter for the flow by the length of the packet (450).

The scheduler then determines whether all of the flows to which it is linked have been polled (460). If so, the scheduler decrements the sustained rate counter by one (465) and decrements the peak packet counter by one (470). If not, the scheduler polls the next flow (437) and proceeds as discussed above.

If the peak packet rate counter for the scheduler is not equal to zero (420), the scheduler decrements the peak packet rate counter by one (470) and determines whether the peak packet rate counter for the scheduler is zero (420). The scheduler then proceeds as discussed above.

Pseudocode for a rate-based scheduling procedure is provided below. In the pseudocode, PPR_CNT(i) represents the peak packet rate counter for scheduler i; PPR_INIT(i) represents the initial value for PPR_CNT for scheduler i; SR_CNT(i) represents the sustained rate counter for scheduler i; SR_INIT(i) represents the initial value for SR_CNT for scheduler i; CREDIT_CNT[$F_i(j)$] represents the credit counter for flow j to scheduler i; and CREDIT[Fi(j)] represents the initial value of CREDIT_CNT for flow j to scheduler i.

```
#Initialization
PPR_CNT (i) =PPR_INIT (i)
SR_CNT (i) =SR_INIT (i)
#Always at positive edge of system clock
If PPR_CNT (i) =0
    PPR_CNT (i) =PPR_INIT (i)
    If SR_CNT (i) =0
        SR_CNT (i) =SR_INIT (i)
        For j =1 to N
            CREDIT—CNT [F_i(j)] =min (CREDIT_CNT [F_i(j)], 0) +
                CREDIT [F_i(j)]
        End
    Endif
    For j =1 to N
        If CREDIT_CNT [F_i(j)] >0
        Transmit one packet from Flow F_i(j)
            CREDIT_CNT [F_i(j)]= CREDIT_CNT [F_i(j)]-
                packet length of the above packet
        Endif
    End
    SR_CNT (i) = SR_CNT (i) - 1
Endif
    PPR_CNT (i) =PPR_CNT (i) - 1
End
```

The implementation of rate-based scheduling for packet applications is advantageous because it is sufficiently simple to be implemented in hardware, which is desirable in high-speed network applications where, for example, 256,000 flows may be scheduled through 64 ports. In addition, rate-based scheduling permits flexibility in the number of bytes used for the rate credit counter. By permitting variation in the granularity of the rate credit counter, rate-based scheduling may be tailored to networking applications. For example, memory may be saved if it is sufficient for an application to count multiples of a defined number (e.g., four) of bytes.

Figure 5:
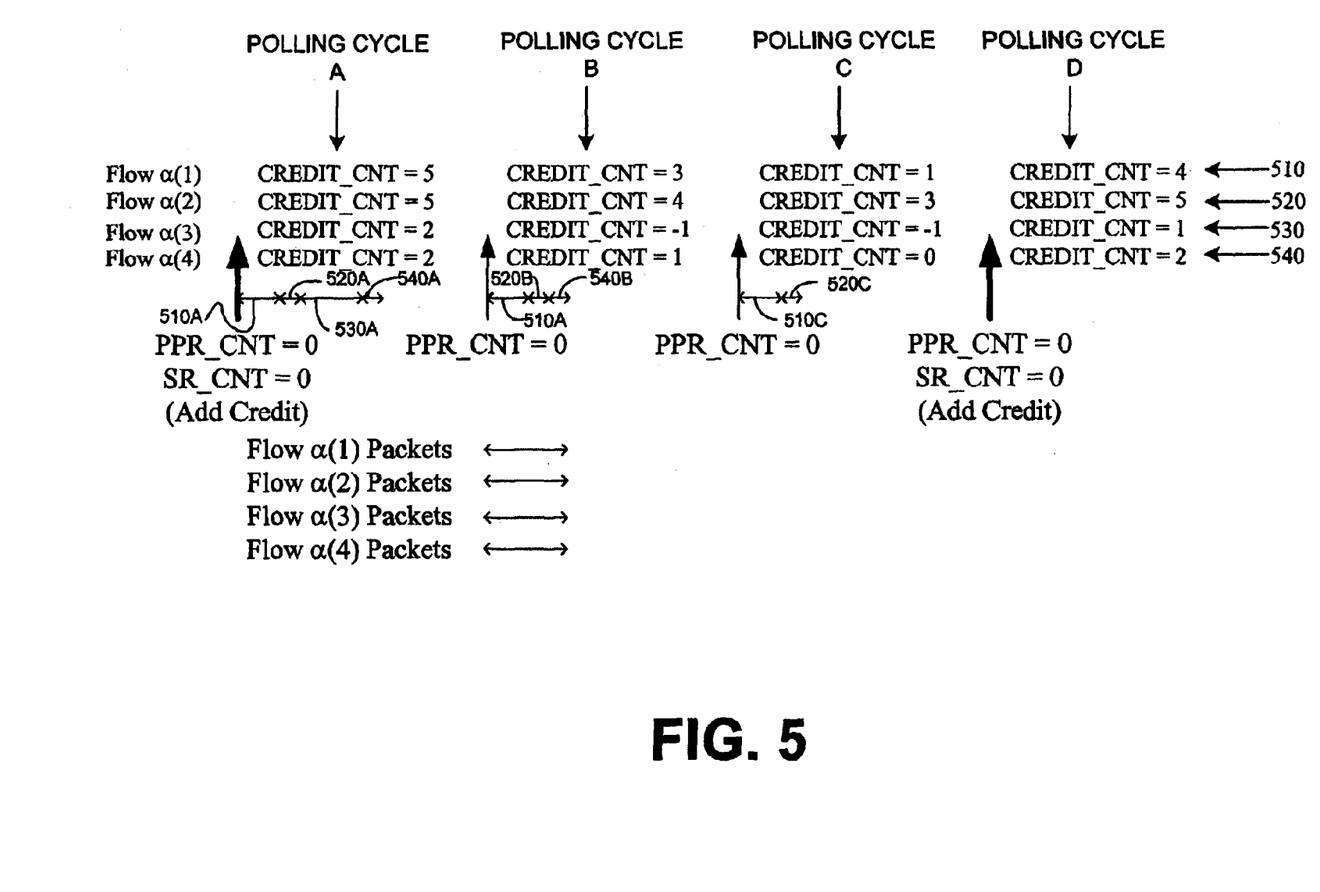
FIG. 5 is a diagram illustrating the transmission of packets through a scheduler.

FIG. 5 illustrates the transmission order of four flows (flow α(1) 510, flow α(2) 520, flow α(3) 530 and flow α(4) 540) that are linked to a scheduler using a rate-based scheduling procedure. At the start of polling period A, the peak packet rate counter (PPR_CNT) is 0, the sustained rate counter (SR-CNT) is 0, and the credit counter (CREDIT_CNT) is 5 for flow α(1) 510 and α(2), and 2 for flow α(3) and α(4).

During polling period A, flow α(1) 510 transmits a packet 510A of two bytes after which the credit counter for flow α(1) 510 is reduced by 2 so that flow α(1) ends polling period A with a credit counter equal to 3. Flow α(2) 520 transmits a one-byte packet 520A and ends with a credit counter of 4. Flow α(3) 530 transmits a three-byte packet 530A, and ends with a credit counter of −1. Flow α(4) 540 transmits a one-byte packet 540A and ends with a credit counter of 1.

At the start of polling period B, the peak packet rate counter equals zero and credit is not added to the flows because the scheduler has not been active for the required number of times (here, three times). Flow α(1) 510 begins polling period B with a credit counter of 3, transmits a two-byte packet 510B, and ends with a credit counter of 1. Flow α(2) 520 begins polling period B with a credit counter of 4, transmits a one-byte packet 520B, and ends with a credit counter of 3. Flow α(3) 530 begins polling period B with a credit counter of −1, does not transmit, and ends with a credit counter of −1. Flow α(4) 540 begins polling period B with a credit counter of 1, transmits a one-byte packet 540B, and ends with a credit counter of 0.

At the start of polling period C, the peak packet rate counter equals zero and credit is not added to the flows because the scheduler has not been active the required number of times. Flow α(1) 510 begins polling period C with a credit counter of 1, transmits a two-byte packet 510C, and ends with a credit counter of −1. Flow α(2) 520 begins polling period C with a credit counter of 3, transmits a one-byte packet 520C, and ends with a credit counter of 2. Flow α(3) 530 begins polling period C with a credit counter of −1, does not transmit, and ends with a credit counter of −1. Flow α(4) 540 begins polling period C with a credit counter of 0, does not transmit, and ends with a credit counter of 0.

At the start of polling period D, because the peak packet rate counter equals zero and the scheduler has been active the required number of times, credit is added to each flow. If the credit counter is equal to zero or is positive, the credit counter for the flow is set equal to the initial amount of rate credit provided to the flow, which is five for flows α(1) 510 and α(2) 520 or two for flows α(3) 530 and α(4) 540 in this implementation. If the credit counter for a flow is negative when credit is given to the flow, then the initial value of rate credit provided to the flow is added to the credit counter for the flow.

Because flows α(1) 510 and α(3) 530 ended polling period C with credit counters of −1, flows α(1) 510 and α(3) 530 begin polling period D with credit counters of 4 and 1, respectively, which equal the difference between the initial value of credit provided (here, 5 and 2) and the amount by which the flows have exceeded their rate credit (here, 1). Because flows α(2) 520 and α(4) 540 ended polling period C with credit counters of 2 and 0, flows α(2) 520 and α(4) 540 begin polling period D with credit counters of 5 and 2, respectively, which equal the initial value of credit provided.

Figure 6A:
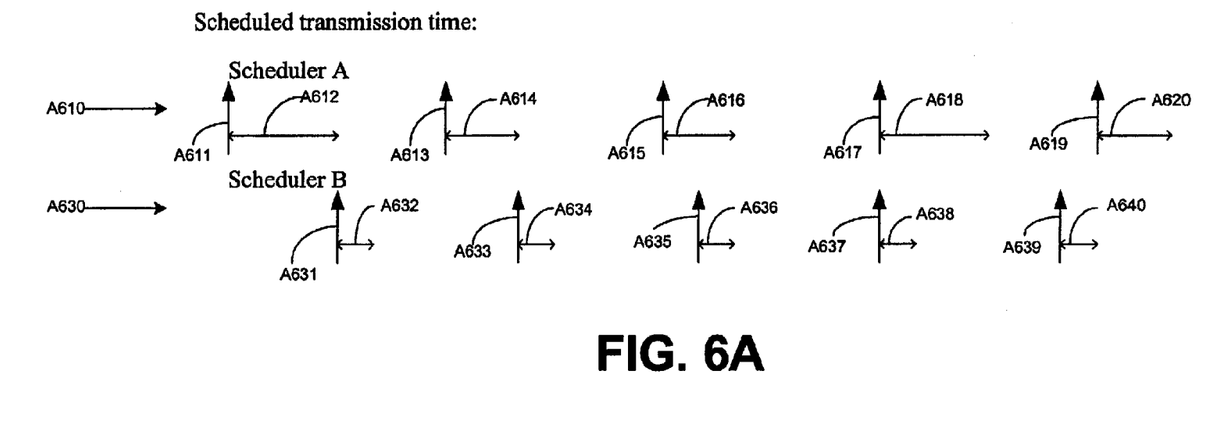
FIGS. 6A and 6B are diagrams illustrating the transmission time of packets to a port with FIG. 6A showing the scheduled transmission time and FIG. 6B showing the actual transmission time.
Figure 6B:
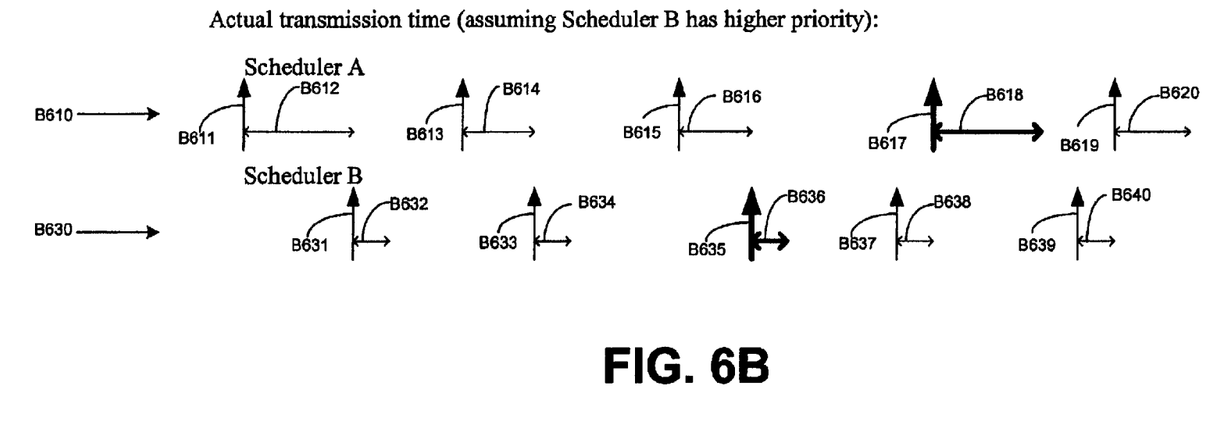

The results of a rate-based scheduling method are illustrated in FIGS. 6A and 6B, which compare the actual transmission time achieved as shown in FIG. 6B with the scheduled transmission time as shown in FIG. 6A. FIG. 6A illustrates the scheduled transmission times of two schedulers A610 and A630. The upward pointing arrows A611, A613, A615, A617, A619, A631, A633, A635, A637, and A639 indicate the starts of scheduled transmission times, and the horizontal pointing arrows A612, A614, A616, A618, A620, A632, A634, A636, A638, and A640 represent the transmission durations of the scheduled transmissions.

FIG. 6B illustrates the actual transmission times of two schedulers B610 and B630. The upward pointing arrows B611, B613, B615, B617, B619, B631, B633, B635, B637, and B639 indicate the start of scheduled transmission times, and the horizontal pointing arrows B612, B614, B616, B618, B620, B632, B634, B636, B638, and B640 represent the transmission durations of the scheduled transmissions.

The duration of delayed scheduler transmissions is equal to the scheduled transmission time, as illustrated by FIG. 6. The start of transmission B635 of scheduler B630 occurs later than scheduled due to a conflict with scheduler B610 as shown by the overlapping transmission lines A616 and A636. The transmission duration of delayed scheduler B630 is as expected, as indicated by B636 and A636 having the same length. How scheduled durations are not affected by the delay of a scheduled transmission is also illustrated by comparing A617 with B617 and A618 with B618.

As discussed above with respect to FIG. 2, when contention arises between two schedulers which are ready to transmit at the same time, the priority given to each scheduler may be determined by an arbitrator using an arbitration method, which may be static or dynamic among schedulers. A dynamic arbitration method, for example, may be changed based on the size of a packet, based on a priority of the packet being transmitted, or based on one or more other conditions.

The scheduler with the higher priority transmits first. Once a scheduler has started to transmit, the scheduler proceeds to check every flow linked to the scheduler and transmits one packet if the flow has sufficient rate credit. Once a scheduler starts transmitting, the scheduler is not interrupted but continues polling each flow and transmitting where appropriate, even if another scheduler that has a higher priority becomes ready to transmit before the first scheduler completes polling all of its flows.

If the transmission time of a scheduler is delayed—for example, due to the transmission of packets from flows linked to other schedulers or due to losing an arbitration, the length of the transmission time for the scheduler is not changed and the transmission time is only shifted. This is advantageous for network applications involving real-time data, such as voice, where schedulers supporting a higher peak packet rate for voice may be given higher priority and where non-real-time data may be linked to schedulers with a different peak service rate.

The rate-based scheduling may also manage the sharing of transmission time among different ports, as discussed above with respect to FIG. 2. Typically, a time-division multiplexing system is used. In such a system, the time assigned to each port is proportional to the transmission rate of the port. Other multiplexing techniques, however, may also be appropriate. The transmission of a packet may be interrupted by another port, with each port determining which packets to transmit independently of the other ports.

When the transmission from one port is changed to another, the rate-based scheduling may store the current flow that was interrupted during transmission in the scheduler, store the memory address of the current packet in transmission at the point of interruption in the control memory of the current flow that was in transmission, and store the scheduler in on-chip memory. When the interrupted port resumes transmission during its assigned time slot, the scheduler that was interrupted is accessed from on-chip memory storage and the packet that was in transmission before the interruption is accessed from the scheduler. The transmission of this packet then resumes from the point of interruption.

Figure 7:
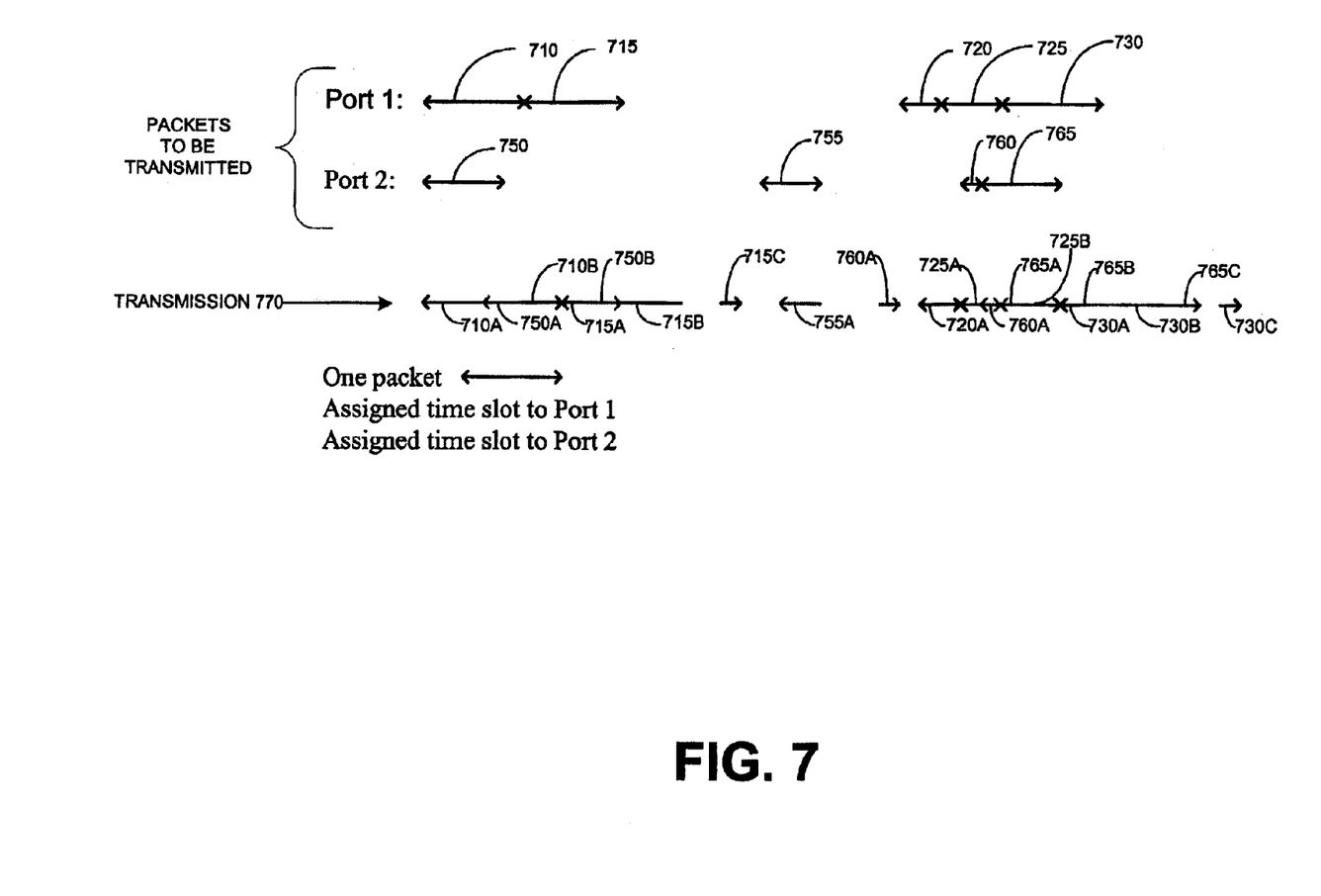
FIG. 7 is a diagram illustrating time sharing between ports.

FIG. 7 illustrates this transparent sharing of two ports (Port 1 and Port 2). The length of a packet to be transmitted is indicated by a line with an arrow head at each end. The ratio of the transmission rate of Port 1 to Port 2 is 3:2. Five packets 710, 715, 720, 725, and 730 are transmitted by Port 1 and four packets 750, 755, 760, and 765 are transmitted by Port 2.

Time sharing between the two ports in transmitting these nine packets is illustrated by item 770. The packets being transmitted by each port may be interleaved, such that the transmission of a complete packet may be interrupted, with the transmission by each port resuming from each point of interruption. For example, the transmission 710A of packet 710 by Port 1 is interrupted by the transmission 750A of packet 750 by Port 2. After transmission 750A is completed, Port 1 resumes transmission 710B of packet 710.

The benefits of rate-based scheduling are not limited to the particular implementations described but are equally applicable to other implementations. For example, an implementation may involve transmitting packets using a SONET ("Synchronous Optical Network") or SDH ("Synchronous Digital Hierarchy") system.

Implementations may include a method or process, an apparatus or system, or computer software on a computer medium. Other implementations are within the scope of the following claims.

What is claimed is:

1. A scheduling method for a packet switching application, the method comprising:
   when a polled flow has a packet to be transmitted, determining whether a rate credit associated with the polled flow satisfies a transmission criterion,
   transmitting the packet from the polled flow when the rate credit associated with the polled flow satisfies the transmission criterion, the packet having a different length than at least one other packet transmitted, and
   when the packet is transmitted from the polled flow, determining a length of the packet and modifying the rate credit associated with the polled flow by an amount corresponding to the length of the packet.

2. The method of claim 1, the method further comprising:
   associating flows of packets with a scheduler, and
   having the scheduler poll each associated flow.

3. The method of claim 2, the method further comprising:
   when a polled flow has a packet to be transmitted, determining whether the scheduler is in compliance with a peak packet rate condition,
   wherein transmitting the packet from the polled flow comprises only transmitting the packet from the polled flow when the scheduler satisfies the peak packet rate condition and the rate credit associated with the polled flow satisfies the transmission criterion.

4. The method of claim 2, the method further comprising modifying the rate credit associated with each flow associated with the scheduler when the scheduler is in compliance with an activity condition.

5. The method of claim 4, wherein modifying the rate credit associated with the flow comprises making the rate credit equal to a predetermined permitted value for the rate credit when the rate credit associated with the flow satisfies a threshold.

6. The method of claim 5, wherein the predetermined permitted value is positive.

7. The method of claim 5, wherein the predetermined permitted value is negative.

8. The method of claim 5, wherein the predetermined permitted value is zero.

9. The method of claim 5, wherein modifying the rate credit associated with the flow further comprises making the rate credit equal to a difference between a magnitude of a current value of the rate credit and the predetermined permitted value when the rate credit does not satisfy the threshold value.

10. The method of claim 1, the method further comprising:
    associating a scheduled transmission start time with the scheduler,
    associating a scheduled transmission duration with the scheduler, and
    when the scheduled transmission start time associated with the scheduler has been delayed, transmitting packets using the scheduler for a period equal to the scheduled transmission duration associated with the scheduler.

11. The method of claim 1, wherein the scheduler transmits packets on a transmission channel using a port, the method further comprising:
    associating more than one port with the transmission channel such that the ports share the transmission bandwidth of the transmission channel;
    associating the scheduler with a particular port;
    associating at least one additional scheduler with the particular port, such that the particular port may interrupt the scheduler when the scheduler is transmitting;
    when the scheduler is interrupted, storing the identity of the interrupted scheduler in the port, storing the identity of the flow which was being transmitted in the scheduler, and storing a memory address of a packet which was being transmitted in the flow which was being transmitted, and
    when the port resumes transmitting, retrieving the identity of the interrupted scheduler from the port, retrieving the identity of the flow which was being transmitted from the scheduler, retrieving the memory address of the packet which was being transmitted from the flow which was being transmitted, and resuming transmission from the point at which the scheduler was interrupted.

12. The method of claim 1, wherein an arbiter determines which scheduler may transmit packets, the method further comprising:
    associating the scheduler with a particular arbiter,
    associating at least one additional scheduler with the particular arbiter, and
    when two schedulers are ready to transmit, determining which scheduler should transmit by using an arbitration procedure algorithm.

13. The method of claim 12, wherein the arbitration algorithm procedure is static.

14. The method of claim 12, wherein the arbitration procedure is dynamic.

15. A scheduling apparatus for a packet switching network, the apparatus including a scheduler structured and arranged to:
    determine whether a rate credit associated with a polled flow satisfies a transmission criterion when the polled flow has a packet to be transmitted, transmit the packet from the polled flow when the rate credit associated with the polled flow satisfies the transmission criterion, the packet having a different length than at least one other packet transmitted, and when the packet is transmitted from the polled flow, determine a length of the packet and modify the rate credit associated with the polled flow by an amount corresponding to the length of the packet.

16. The apparatus of claim 15 wherein the apparatus comprises a scheduler, the apparatus being further configured to:

have associated flows of packets, and poll each associated flow.

17. The apparatus of claim 16, the apparatus being further configured to:

determine whether the scheduler is in compliance with a peak packet rate condition when a polled flow has a packet to be transmitted, and only transmit the packet from the polled flow when the scheduler satisfies the peak packet rate condition and the rate credit associated with the polled flow satisfies the transmission criterion.

18. The apparatus of claim 15, the apparatus being further configured to modify the rate credit associated with each flow associated with the scheduler when the scheduler is in compliance with an activity condition.

19. The apparatus of claim 18, the apparatus being further configured to modify the rate credit associated with the flow by making the rate credit equal to a predetermined permitted value for the rate credit when the rate credit associated with the flow satisfies a threshold.

20. The apparatus of claim 19, the apparatus being further configured to modify the rate credit associated with the flow by making the rate credit equal to a difference between a magnitude of a current value of the rate credit and the predetermined permitted value when the rate credit does not satisfy the threshold value.

21. The apparatus of claim 15, the apparatus being further configured to:

associate a scheduled transmission start time and scheduled transmission duration with the scheduler, and transmit packets using the scheduler for a period equal to the scheduled transmission duration associated with the scheduler when the scheduled transmission start time associated with the scheduler has been delayed.

22. A computer readable medium or propagated signal having embodied thereon a computer program for a packet switching application, the computer program comprising:

a code segment to determine whether a rate credit associated with a polled flow satisfies a transmission criterion when the polled flow has a packet to be transmitted, a code segment to transmit a packet from the polled flow when the rate credit associated with the polled flow satisfies the transmission criterion, the packet having a different length than at least one other packet transmitted, and a code segment to, when the packet is transmitted from the polled flow, determine a length of the packet and modify the rate credit associated with the polled flow by an amount corresponding to the length of the packet.

23. The medium of claim 22, the medium further comprising:

a code segment to associate flows of packets with a scheduler, and a code segment to have the scheduler poll each associated flow.

24. The medium of claim 23, the medium further comprising:

a code segment to determine whether the scheduler is in compliance with a peak packet rate condition when a polled flow has a packet to be transmitted, and a code segment to only transmit the packet from the polled flow when the scheduler satisfies the peak packet rate condition and the rate credit associated with the polled flow satisfies the transmission criterion.

25. The medium of claim 22, the medium further comprising a code segment to modify the rate credit associated with each flow associated with the scheduler when the scheduler is in compliance with an activity condition.

26. The medium of claim 25 wherein modifying the rate credit associated with the flow comprises making the rate credit equal to a predetermined permitted value for the rate credit when the rate credit associated with the flow satisfies a threshold.

27. The medium of claim 26, wherein modifying the rate credit associated with the flow further comprises making the rate credit equal to a difference between a magnitude of a current value of the rate credit and the predetermined permitted value when the rate credit does not satisfy the threshold value.

28. The medium of claim 22, the medium further comprising:

a code segment to associate a scheduled transmission start time with the scheduler, code segment to associate a scheduled transmission duration with the scheduler, and a code segment to transmit packets using the scheduler for a period equal to the scheduled transmission duration associated with the scheduler when the scheduled transmission start time associated with the scheduler has been delayed.

29. The medium of claim 22 wherein the scheduler transmits packets on a transmission channel using a port, the medium further comprising:

a code segment to associate more than one port with the transmission channel such that the ports share the transmission bandwidth of the transmission channel;

a code segment to associate the scheduler with a particular port;

a code segment to associate at least one additional scheduler with the particular port, such that the particular port may interrupt the scheduler when the scheduler is transmitting;

a code segment to store, when the scheduler is interrupted, the identity of the interrupted scheduler in the port, the identity of the flow which was being transmitted in the scheduler, and a memory address of a packet which was being transmitted in the flow which was being transmitted, and a code segment to retrieve, when the port resumes transmitting, the identity of the interrupted scheduler from the port, the identity of the flow which was being transmitted from the scheduler, the memory address of the packet which was being transmitted from the flow which was being transmitted, and to resume transmission from the point at which the scheduler was interrupted.

30. The medium of claim 22 wherein an arbiter determines which scheduler may transmit packets, the medium further comprising:

a code segment to associate the scheduler with a particular arbiter, a code segment to associate at least one additional scheduler with the particular arbiter, and a code segment to determine, when two schedulers are ready to transmit, which scheduler should transmit by using an arbitration procedure.

31. A scheduling method for a packet switching application, the method comprising:

when a polled flow has a packet to be transmitted, determining whether a rate credit associated with the polled flow satisfies a transmission criterion and determining whether the scheduler is in compliance with a peak packet rate condition, transmitting the packet from the polled flow when the rate credit associated with the polled flow satisfies the transmission criterion and the scheduler is in compliance with the peak packet rate condition, and when the packet is transmitted from the polled flow, modifying the rate credit associated with the polled flow by an amount corresponding to the length of the packet.

32. The method of claim 31, the method further comprising determining whether the scheduler is in compliance with a peak packet rate condition when a polled flow has a packet to be transmitted, wherein transmitting the packet from the polled flow comprises only transmitting the packet from the polled flow when the scheduler satisfies the peak packet rate condition and the rate credit associated with the polled flow satisfies the transmission criterion.

33. The method of claim 32 further comprising:

associating flows of packets with a scheduler, having the scheduler poll each associated flow, and modifying the rate credit associated with each flow associated with the scheduler when the scheduler is in compliance with an activity condition.

34. The method of claim 33, wherein modifying the rate credit associated with the flow comprises making the rate credit equal to a predetermined permitted value for the rate credit when the rate credit associated with the flow satisfies a threshold value.

35. The method of claim 33, wherein modifying the rate credit associated with the flow further comprises making the rate credit equal to a difference between a magnitude of a current value of the rate credit and the predetermined permitted value when the rate credit does not satisfy a threshold value.

36. A scheduling apparatus for a packet switching network, the apparatus including a scheduler structured and arranged to:

when a polled flow has a packet to be transmitted, determine whether a rate credit associated with the polled flow satisfies a transmission criterion and determine whether the scheduler is in compliance with a peak packet rate condition, transmit the packet from the polled flow when the rate credit associated with the polled flow satisfies the transmission criterion and the scheduler is in compliance with the peak packet rate condition, and when the packet is transmitted from the polled flow, modify the rate credit associated with the polled flow by an amount corresponding to the length of the packet.

37. The apparatus of claim 36, the apparatus being further configured to determine whether the scheduler is in compliance with a peak packet rate condition when a polled flow has a packet to be transmitted, wherein transmitting the packet from the polled flow comprises only transmitting the packet from the polled flow when the scheduler satisfies the peak packet rate condition and the rate credit associated with the polled flow satisfies the transmission criterion.

38. The apparatus of claim 36, the apparatus being further configured to modify the rate credit associated with each flow associated with the scheduler when the scheduler is in compliance with an activity condition.

39. The apparatus of claim 38, the apparatus being further configured to make the rate credit equal to a predetermined permitted value for the rate credit when the rate credit associated with the flow satisfies a threshold value.

40. The apparatus of claim 38, the apparatus being further configured to make the rate credit equal to a difference between a magnitude of a current value of the rate credit and the predetermined permitted value when the rate credit does not satisfy a threshold value.

* * * * *